United States Patent [19]

Comstock et al.

[11] 3,969,991
[45] July 20, 1976

[54] ROLLING DIAPHRAGM AND ROLLING DIAPHRAGM DEVICES

[75] Inventors: Donald W. Comstock, Lexington; Peter B. Marchetti, Westford, both of Mass.

[73] Assignee: Bellofram Corporation, Burlington, Mass.

[22] Filed: Mar. 3, 1975

[21] Appl. No.: 554,945

[52] U.S. Cl. .................................. 92/99; 92/98 D; 92/105
[51] Int. Cl.[2] ...................... F01B 19/00; F16J 3/02
[58] Field of Search .................. 92/98 D, 99, 103 R, 92/103 M, 104, 105

[56] References Cited
UNITED STATES PATENTS

| | | | |
|---|---|---|---|
| 349,758 | 9/1886 | Solano | 92/94 |
| 2,779,353 | 1/1957 | Coffey | 92/104 |
| 2,874,569 | 2/1959 | Gray | 92/104 |
| 3,315,572 | 4/1967 | Taplin | 92/99 |
| 3,403,603 | 10/1968 | Turner | 92/99 |
| 3,405,609 | 10/1968 | Lee | 92/99 |

*Primary Examiner*—Martin P. Schwadron
*Assistant Examiner*—Abraham Hershkovitz
*Attorney, Agent, or Firm*—Erwin Salzer

[57] ABSTRACT

A rolling diaphragm not subject to the formation of cusps. The rolling wall of the diaphragm is made up of two regions, one region intended to engage the lateral wall of the piston of the rolling diaphragm device, and another region intended to extend from the lateral wall of the piston of the rolling diaphragm device to the diaphragm clamping region formed by the cylinder body of the rolling diaphragm device. In the first mentioned region the rate of change of diameter along the rolling wall is relatively small, or minimized. The second region is circularly shaped in cross-section. The radius of curvature of the cross-section of that portion is relatively large, so that the rate of change of diameter of the rolling wall in that portion thereof is relatively large.

2 Claims, 7 Drawing Figures

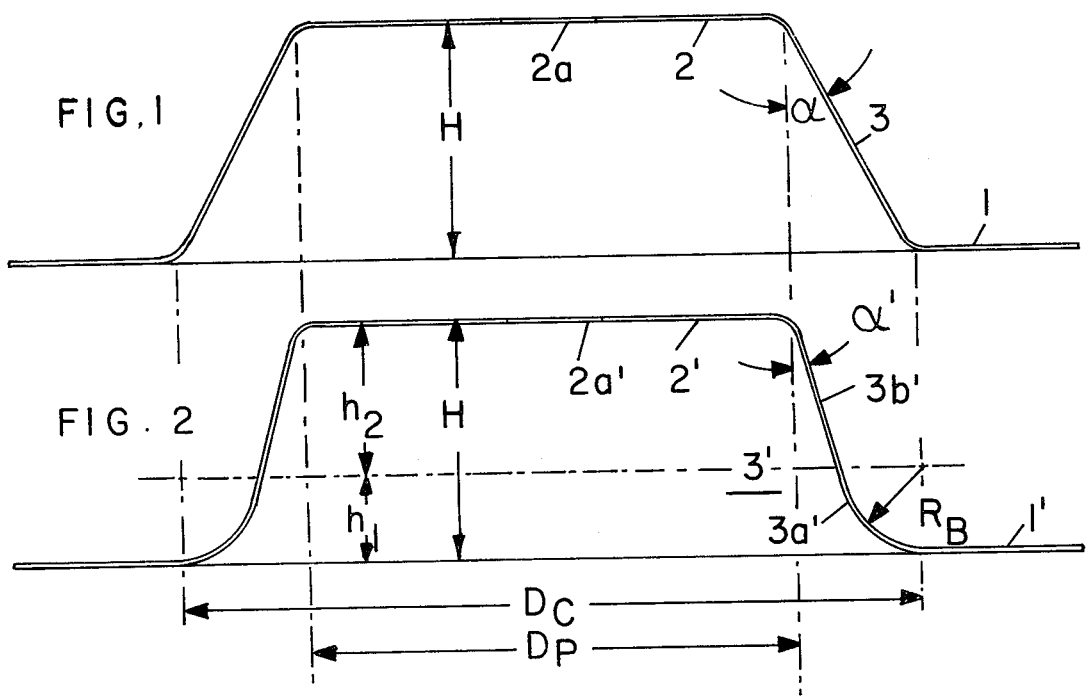
FIG. 1
FIG. 2
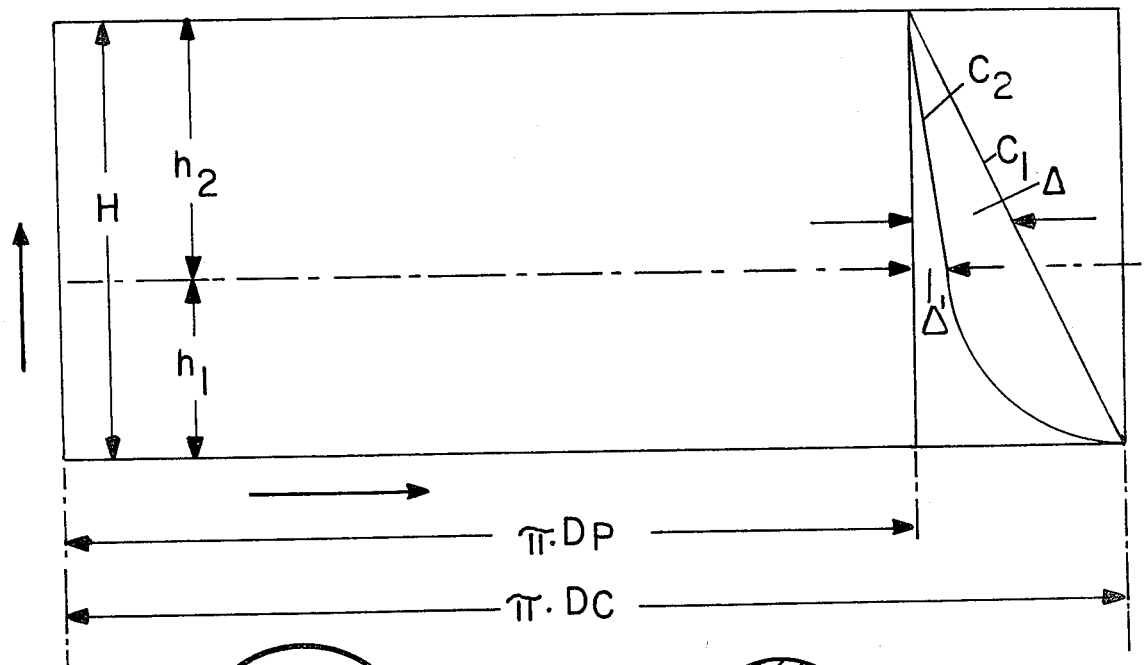
FIG. 3
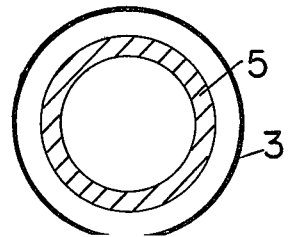
FIG. 4
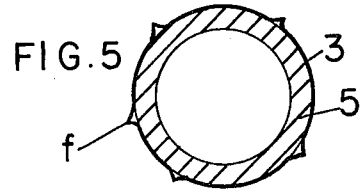
FIG. 5

ROLLING DIAPHRAGM AND ROLLING DIAPHRAGM DEVICES

BACKGROUND OF THE INVENTION

This invention refers to rolling diaphragms as such, and to rolling diaphragm devices, i.e., devices that include, in addition to the rolling diaphragm, a piston and a cylinder body.

This invention refers more particularly to rolling diaphragms made up of a fabric and an elastomer, and having an inherent resilience. Diaphragms of this kind and the way of manufacturing the same are disclosed, for instance, in U.S. Pat. No. 2,849,026 to John F. Taplin, 08/26/58 for FLEXIBLE FLUID SEALING DIAPHRAGM. The rolling diaphragms disclosed in the above referred-to patent include a woven fabric to reinforce the same, but are nevertheless subject to the drawback of cusping, which is a kind of pleat formation that will be explained below in detail.

It is the primary object of this invention to provide rolling diaphragms not subject to the above referred-to drawback, and to provide rolling diaphragm devices whose rolling diaphragms are not subject to the above drawback. Rolling diaphragm devices are well known in the art and, therefore, need not to be described in detail in this context. Reference may be had to the following patents to John F. Taplin for more detailed disclosures of rolling diaphragm devices. U.S. Pat. Nos. 3,250,225, 05/10/66; 3,386,345, 06/04/68; 3,561,484, 02/09/71; etc.

In rolling diaphragms including an elastomer and a re-inforcement fabric the latter is generally situated during the manufacturing process of the diaphragm on the outer surface thereof. During the installation of the rolling diaphragm the latter is inverted so that the fabric lies on the outside of its convoluted rolling wall-portion and against the piston of the rolling diaphragm device. As a general rule the portion of the rolling diaphragm which is clamped against the cylinder body, i.e. the cylinder clamping flange projects when the diaphragm is installed from the rolling wall thereof at an angle of substantially 90 degrees, as is apparent from the above patents. Prior to its installation a rolling diaphragm is substantially hat-shaped, or in the shape of a frustum of a cone, as shown, for instance, in the above referred-to U.S. Pat. No. 2,849,026.

BRIEF DESCRIPTION OF THE DRAWINGS

FIG. 1 is a diagrammatic cross-sectional representation of a prior art rolling diaphragm;

FIG. 2 is a diagrammatic cross-sectional representation of a rolling diaphragm embodying the present invention;

FIG. 3 is a diagram comparing prior art rolling diaphragms with diaphragms embodying the present invention, and is more specifically a plot of height versus circumference;

FIGS. 4 and 5 are cross-sections across a prior art rolling diaphragm device and explain the formation of so-called cusps;

DESCRIPTION OF PREFERRED EMBODIMENT

Figure 6:
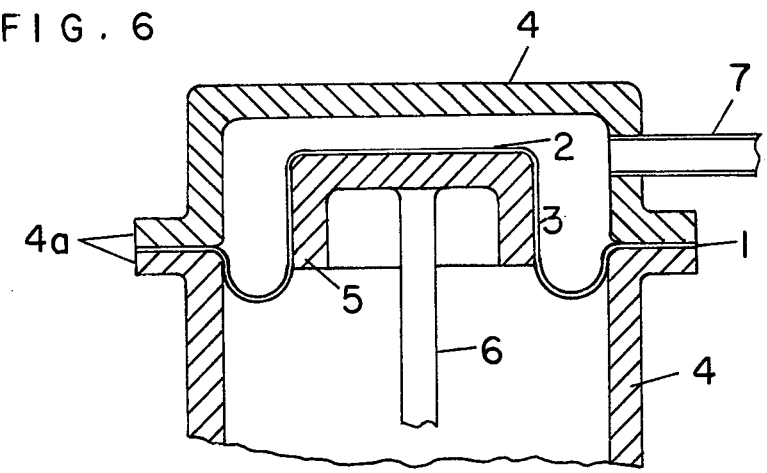
FIG. 6 is a diagrammatic longitudinal section of a prior art rolling diaphragm device.

Referring now to the drawing, and more particularly to FIG. 1 thereof, the rolling diaphragm shown therein includes a cylinder clamping flange 1 intended to be clamped to a cylinder body. Reference character Dc has been applied to indicate the inner diameter of flange 1 equal to the inner diameter of a cylinder body in connection with which the rolling diaphragm is intended to be used. The rolling diaphragm further includes a piston clamping flange 2 having a diameter Dp smaller than diameter Dc. The diameter Dp is equal to the outer diameter of a piston in connection with which the rolling diaphragm is intended to be used. Piston clamping flange 2 may be provided with a central aperture 2a. The rolling wall 3 extends between cylinder clamping flange 1 and piston clamping flange 2. The structure as a whole is in the shape of a solid of revolution, and more particularly in the shape of a frustum of a cone. Flanges 1 and 2 are arranged in parallel planes whose spacing has been indicated by the reference character H. Reference character $\alpha$ has been applied to indicate the angle complementary to the angle enclosed between the generatrices of the frustum of a cone structure 1,2,3 and the plane defined by flange 2. It will be apparent that tan $$\alpha = \frac{Dc-Dp}{2 \cdot H}.$$

Hence $$\alpha = \arctan \frac{Dc-Dp}{2 \cdot H}.$$

Each generatrix of the frustum of a cone has a substantially constant or linear rate of rise between the parallel planes defined by flanges 1 and 2.

Referring now to FIG. 2, reference character 1' has been applied to indicate the cylinder clamping flange of relatively large diameter, reference character 2' has been applied to indicate the piston clamping flange of relatively small diameter having the central aperture 2a', and reference character 3' has been applied to indicate the rolling wall extending between flanges 1' and 2'. The diameters Dc and Dp of FIG. 2 are the same as in FIG. 1. The rolling wall of FIG. 2 comprises two regions 3a' and 3b'. The first region 3a' of rolling wall 3' is situated adjacent cylinder clamping flange 1', and is shaped substantially circularly in cross-section. The diameters of region 3a' of rolling wall 3' decrease at a relatively rapid rate until the height $h_1$ is reached. The second region 3b' of rolling wall 3' extends along the height $h_2$ which is the preponderant portion of the distance H between flanges 1' and 2'. The portion 3b' of rolling wall 3' is substantially in the shape of a frustum of a cone, and the diameters of region 3b' of rolling wall 3' decrease at a relatively small rate, i.e. at a smaller rate than the rate of decrease of the diameters of region 3a'. The radius of curvature $R_B$ of the cross-section of the region 3a' of rolling wall 3' may be referred-to as blend radius. This radius is determined by the inequality $$R_B > \frac{Dc-Dp}{4}.$$

The difference in operation of the rolling diaphragms of FIGS. 1 and 2 will be apparent from FIG. 3. In FIG. 3 the circumference of the flanges 1,2,1',2' of FIGS. 1 and 2 have been plotted as abcissae, and the levels of the rolling walls 3,3' as ordinates. $\pi.Dp$ indicates the outer circumference of the piston of a rolling diaphragm device, or the circumference of piston clamping flanges 2 and 2', respectively. $\pi.Dc$ indicates the inner circumference of the cylinder of a rolling diaphragm device, or the inner circumference of the cylinder clamping flange 1 and 1', respectively. The line $C_1$ indicates the increase in diameter beginning at the plane of flange 2 of FIG. 1 and ending at the plane of flange 1 of FIG. 1. It is apparent that the increase of the circumference of the rolling wall 3 is linear in the contemplated direction and that the circumference of the rolling wall 3 undergoes a linear decrease in the opposite direction. Reference character $\Delta$ has been applied to indicate the difference between the circumference of the piston and the circumference of the rolling wall 3 at a given level of the rolling diaphragm of FIG. 1. FIG. 4 shows the cross-section of a piston 5 and of the rolling wall 3 of a rolling diaphragm taken at a level where — as shown in FIG. 3 — the circumference of the rolling wall 3 exceeds the circumference of the piston. Under such conditions pressure acting on the surface of the rolling wall 3 tends to press the latter against the lateral wall of the piston which results in the formation of pleats in the rolling wall as shown in FIG. 5, since the circumference of the rolling wall exceeds that of the piston. Reference character $f$ has been applied in FIG. 5 to indicate these pleats. This situation is known as cusping and the pleats $f$ are referred-to as cusps. Cusping greatly reduces the life of rolling diaphragms.

In FIG. 3 the line $C_2$ indicates the increase of the diameter of the rolling wall 3' of FIG. 2 in the direction from flange 2' to flange 1'. This increase is much less than that of the structure of FIG. 1 as far as the region $3b'$ is concerned. The increase of circumference along the region $3a'$ having the blend radius $R_B$ is very rapid, as is apparent from the lower portion of the line $C_2$ in FIG. 3.

Because in the structure of FIG. 2 the difference of the circumference of the piston and that of the rolling wall 3' is kept relatively small in the region $3b'$ of the latter, the tendency of cusping is greatly decreased. In practice the rolling wall has no strictly fixed circumference, as indicated in FIG. 3, but can vary its circumference within limits due to its inherent peripheral elasticity. The geometry of the region $3b'$ of the rolling diaphragm of FIG. 2 coupled with the peripheral flexibility inherent in that region allows to consider the circumference of that region for practical purposes to be equal to the circumference $\pi.Dp$ of the piston, thus safely precluding formation of cusps in the rolling wall 3'. The fact that the circumference of the region $3a'$ of the rolling wall 3 increases rapidly toward flange 1' has no adverse consequences since this region of the rolling diaphragm does not engage the piston and does not need to be fitted to the circumference of the latter.

In FIG. 6 reference character 4 has been applied to indicate a cylinder body having a predetermined inner diameter and clamping means or flanges $4a$ for clamping the cylinder flanges 1 of a rolling diaphragm 1,2,3. A piston 5 having a predetermined outer diameter is movably arranged inside of cylinder body 4. Piston 5 is provided with a piston rod 6 and is movable between two limit positions. FIG. 6 shows the piston in its upper limit position wherein the lateral wall of the piston is engaged along its entire length by the rolling wall 3 of the rolling diaphragm 1,2,3. Fluid under pressure may be admitted to cylinder body 4 through passageway 7. Piston 5 may be acted upon by a spring (not shown) by the force of which it has been moved to its upper limit position shown in FIG. 6. In that position there is a maximal difference (not shown in FIG. 6) between the circumference of piston 5 and that of rolling wall 3, maximizing the danger of cusp formation.

Figure 7:
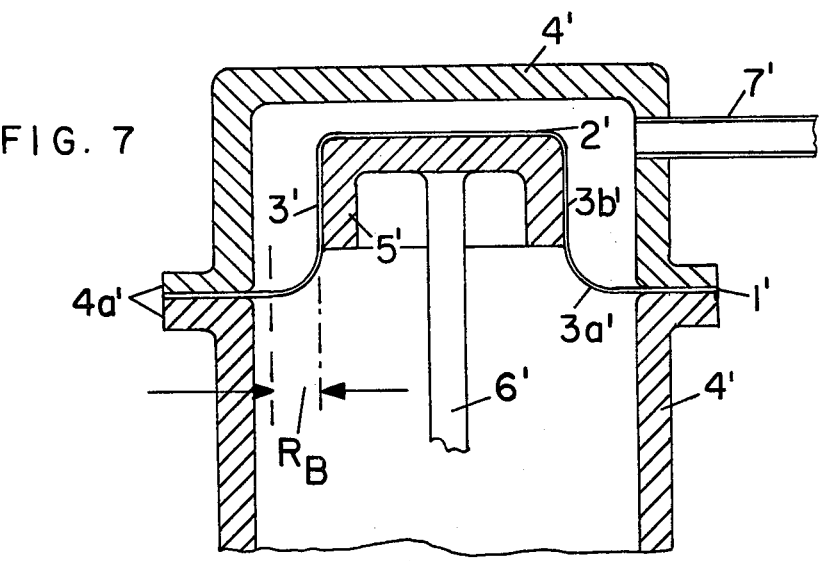
FIG. 7 is a view similar to FIG. 6 but showing a rolling diaphragm device embodying the present invention.

FIG. 7 refers to a structure similar to that shown in FIG. 6 but including the rolling diaphragm of FIG. 2 rather than of FIG. 1. In FIG. 7 the same reference numerals as in FIG. 1 with a prime added have been applied to indicate like parts and thus FIG. 7 is self-explanatory.

It will be apparent from a joint consideration of FIGS. 2 and 7 that the distance designated by the reference character $h_2$ in FIG. 2 is substantially equal to the length of the generatrices of the piston 5' of FIG. 7. It will further be apparent from a joint consideration of FIGS. 2, 3 and 7 that if the distance $\Delta'$ of FIG. 3 is equal to the possible maximal increase of the circumference of the region $3b'$ of the rolling diaphragm 3' due to its resiliency, the formation of cusps cannot occur.

As mentioned above, the blend radius $$R_B > \frac{Dc - Dp}{4}.$$

Rolling diaphragms as shown in FIG. 2 have successfully performed in structures as shown in FIG. 7 with the following measurements.

$$\begin{aligned}
Dc &= 1.40'' \\
Dp &= 1.00'' \\
H &= 0.4'' \\
\frac{Dc-Dp}{4} &= 0.1'' \\
R_B &= 0.17''
\end{aligned}$$

In FIG. 2 the angle $\alpha'$ is the complement to the angle enclosed between the generatrices of the cone-shaped region $3b'$ of rolling wall 3' and the plane defined by flange 2'. It is evident that the angle $\alpha' < \alpha$. Since $$\alpha = \arctan \frac{Dc-Dp}{2.H}, \quad \alpha' < \arctan \frac{Dc-Dp}{2.H}.$$

The geometrical configuration of a rolling diaphragm can be defined in different ways. One of the ways in defining its geometrical configuration refers to the diaphragm as a separate structure. FIGS. 1-3 refer to rolling diaphragms as separate structures and FIGS. 6 and 7 refer to rolling diaphragms combined with a cylinder body and a piston. As explained in connection with FIG. 3 the diaphragm according to this invention shown in FIG. 2 differs from the prior art diaphragm shown in FIG. 1 in that its rolling wall 3' differs from the frustum of a cone defined by the clamping flanges having the diameter $D_P$ and $D_C$. The deviations of the rolling wall 3' from that frustum of a cone are twofold. (1) The rolling wall 3' includes a first region $3a'$ adjacent cylinder clamping flange 1'. The diameters of the transverse cross-sections (FIG. 4) of region $3a'$ decrease relatively rapidly in axial direction, i.e. at a more rapid rate than the diameters of the transverse cross-sections of the region $3b$. The radial cross-sections of the first region $3a'$ have radii of curvature $R_B$ larger than ¼ Of $D_C$-$D_P$, $R_B$ being a critical value as set forth above. (2) The rolling wall $3'$ includes a second region $3b'$ having diameters that change in axial direction at a slower rate than the diameters of the frustum of a cone defined by the magnitudes $D_C$ and $D_P$. As a result of this slower rate of change all the transverse cross-sectional diameters of the region $3b'$ are sufficiently close to the outer diameter of piston $5'$ (FIG. 7) to preclude cusping of rolling the wall $3'$ shown in FIG. 5.

We claim as our invention:

1. A rolling diaphragm device including in combination
   a. a cylinder body having a fixed inner diameter and being provided with diaphragm clamping means;
   b. a piston having a fixed outer diameter movable inside said cylinder body between a pair of limit positions, said outer diameter of said piston being considerably smaller than said inner diameter of said cylinder body so as to establish a toroidal clearance between said cylinder body and said piston of sufficient width to receive the convolution of a rolling diaphragm therein; and
   c. a rolling diaphragm having a first clamping flange clamped between said diaphragm clamping means of said cylinder body, a second clamping flange clamped against the end surface of said piston and a rolling wall having a first region immediately adjacent said diaphragm clamping means of said cylinder body, said first region having when said piston is in one of said pair of limit positions thereof curved radial cross-sections with a radius of curvature larger than one fourth of the difference between said inner diameter of said cylinder body and said outer diameter of said piston, said rolling wall having further a second region remote from said clamping means of said cylinder body and the transverse cross-sections of said second region having diameters sufficiently close to said outer diameter of said piston to preclude cusping of said rolling wall of said rolling diaphragm.

2. A substantially hat-shaped rolling diaphragm as a separate structure including a cylinder clamping flange having a radially inner relatively large diameter, a piston clamping flange parallel to said cylinder clamping flange having a radially outer edge of relatively small diameter and a rolling wall extending between said cylinder clamping flange and said radially outer edge of said piston clamping flange wherein said rolling wall ($3'$) includes a first region ($3a'$) immediately adjacent said cylinder clamping flange ($1'$), the radii of the transverse cross-sections of said first region ($3a'$) decreasing at a relatively rapid rate in axial direction from the plane defined by said cylinder clamping flange ($1'$) toward the plane defined by said piston clamping flange ($2'$), the radial cross-sections of said first region ($3a'$) of said rolling wall ($3'$) having radii of curvature ($R_B$) larger than one fourth of the difference between said radially inner diameter ($D_C$) of said cylinder clamping flange ($1'$) and the diameter ($D_P$) of said radially outer edge of said piston clamping flange ($2'$), and wherein said rolling wall ($3'$) includes a second region ($3b'$) relatively remote from said cylinder clamping flange ($1'$), the radii of the transverse cross-sections of said second region ($3b'$) decreasing at a relatively slow rate in axial direction from the plane defined by said cylinder clamping flange ($1'$) toward the plane defined by said piston clamping flange ($2'$).

* * * * *